US010694418B2

(12) United States Patent
Drevon et al.

(10) Patent No.: US 10,694,418 B2
(45) Date of Patent: Jun. 23, 2020

(54) SUPPORT OF QUALITY OF SERVICE CONTROL IN A MOBILE COMMUNICATION SYSTEM

(71) Applicant: ALCATEL LUCENT, Boulogne-Billancourt (FR)

(72) Inventors: Nicolas Drevon, Nozay (FR); Laurent Thiebaut, Nozay (FR)

(73) Assignee: ALCATEL LUCENT, Boulogne-Billancourt (FR)

( * ) Notice: Subject to any disclaimer, the term of this patent is extended or adjusted under 35 U.S.C. 154(b) by 0 days.

(21) Appl. No.: 14/787,421

(22) PCT Filed: Apr. 25, 2014

(86) PCT No.: PCT/EP2014/058469
§ 371 (c)(1),
(2) Date: Oct. 27, 2015

(87) PCT Pub. No.: WO2014/177470
PCT Pub. Date: Nov. 6, 2014

(65) Prior Publication Data
US 2016/0150439 A1 May 26, 2016

(30) Foreign Application Priority Data
Apr. 29, 2013 (EP) .................................... 13305557

(51) Int. Cl.
*H04W 28/02* (2009.01)
*H04W 72/04* (2009.01)
(Continued)

(52) U.S. Cl.
CPC ..... *H04W 28/0247* (2013.01); *H04L 65/1033* (2013.01); *H04L 65/80* (2013.01);
(Continued)

(58) Field of Classification Search
CPC ......... H04W 28/0247; H04W 28/0268; H04W 28/0205; H04W 72/0413; H04W 88/16
See application file for complete search history.

(56) References Cited

U.S. PATENT DOCUMENTS 7,643,411 B2 * 1/2010 Andreasen ........... G06Q 20/102
370/229
8,498,200 B2 * 7/2013 Das ........................ H04L 12/26
370/217
(Continued)

FOREIGN PATENT DOCUMENTS

EP        2445266 A1    4/2012
JP    2012533969 A    12/2012
(Continued)

OTHER PUBLICATIONS

"E-UTRAN—eHRPD Connectivity and Interworking: Core Network Aspects", 3rd Generation Partnership Project 2, Oct. 11, 2011, XP062104590.
(Continued)

*Primary Examiner* — Rasheed Gidado
(74) *Attorney, Agent, or Firm* — Harness, Dickey & Pierce, P.L.C.

(57) ABSTRACT

In an embodiment, a method is provided for support of Quality of Service QoS control in a mobile communication system wherein an User Equipment has access to a mobile network providing Packet Data Network (PDN) connectivity services, said mobile network including a 3GPP Core Network (CN) accessed by a trusted non-3GPP Access Network (TNAN) via an interface between an Access Network Gateway (AN-GW) in said Trusted non-3GPP Access Network (TNAN) and a PDN Gateway PDN-GW in said 3GPP CN, said method including support of 3GPP CN-initiated QoS control, for uplink traffic from said UE, based on QoS control information received by said UE, said QoS
(Continued)

Figure 1:
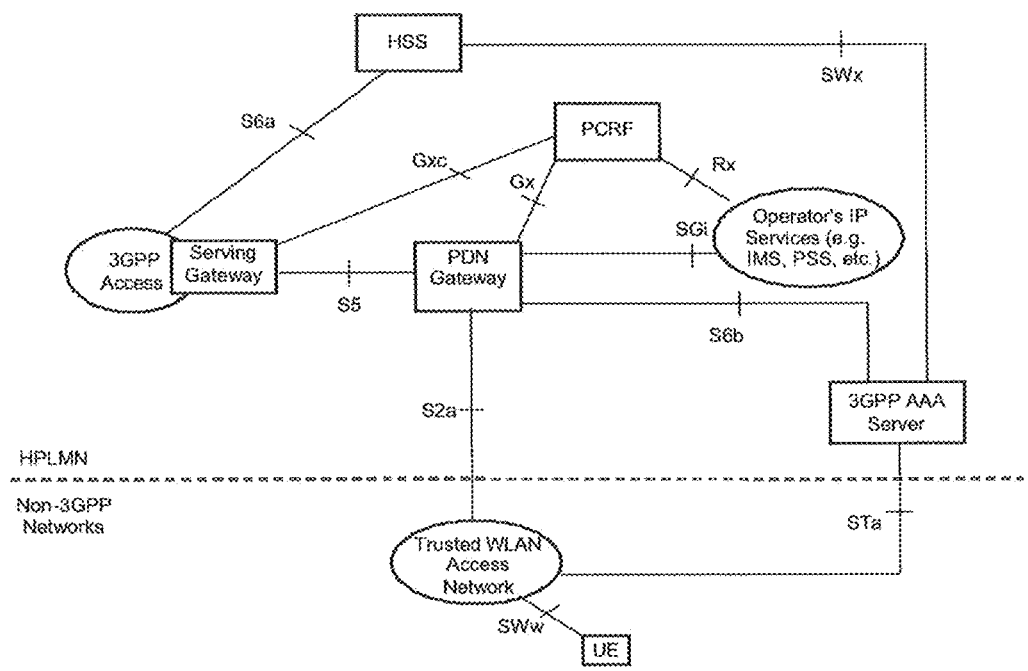

control information allowing the UE to associate uplink traffic flows sent by the UE via Access Network Gateway (AN-GW) towards a PDN Gateway PDN-GW with TNAN connectivity QoS for uplink traffic.

2 Claims, 2 Drawing Sheets

(51) Int. Cl.
H04L 29/06 (2006.01)
H04W 88/16 (2009.01)

(52) U.S. Cl.
CPC ... *H04W 28/0205* (2013.01); *H04W 28/0263* (2013.01); *H04W 28/0268* (2013.01); *H04W 72/0413* (2013.01); *H04W 88/16* (2013.01)

(56) References Cited

U.S. PATENT DOCUMENTS

| | | | | |
|---|---|---|---|---|
| 8,566,455 | B1* | 10/2013 | Zhao | H04W 76/025 709/227 |
| 8,621,555 | B2* | 12/2013 | Zhou | H04L 12/14 726/1 |
| 8,942,099 | B2* | 1/2015 | Yeh | H04W 36/0038 370/235 |
| 2007/0195788 | A1* | 8/2007 | Vasamsetti | H04W 28/24 370/395.21 |
| 2008/0049695 | A1* | 2/2008 | Ogura | H04L 47/2491 370/338 |
| 2008/0273520 | A1 | 11/2008 | Kim et al. | |
| 2009/0190471 | A1* | 7/2009 | Mahendran | H04L 47/14 370/230.1 |
| 2011/0170411 | A1* | 7/2011 | Wang | H04W 76/02 370/235 |
| 2012/0092992 | A1* | 4/2012 | Pappas | H04L 47/2491 370/235 |
| 2012/0263041 | A1* | 10/2012 | Giaretta | H04L 47/2441 370/236 |
| 2012/0269167 | A1* | 10/2012 | Velev | H04W 36/0011 370/331 |
| 2013/0322300 | A1 | 12/2013 | Landais et al. | |
| 2014/0078898 | A1* | 3/2014 | Anchan | H04W 28/0268 370/230 |
| 2014/0093071 | A1* | 4/2014 | Qiang | H04L 63/0892 380/33 |
| 2014/0233380 | A1* | 8/2014 | Kim | H04W 28/24 370/230 |
| 2015/0009826 | A1* | 1/2015 | Ma | H04W 28/0268 370/235 |

FOREIGN PATENT DOCUMENTS

| | | |
|---|---|---|
| WO | WO-2010/002317 | 1/2010 |
| WO | WO-2010/037422 | 4/2010 |
| WO | WO-2011011458 A2 | 1/2011 |

OTHER PUBLICATIONS

"Integration of Cellular and Wi-Fi Networks", Sep. 1, 2013, http://www.4gamericas.orgidocuments, XP055082309.
ZTE et al., "Bearer model in Functional description for GTP based S2a", May 11, 2011, XP050525335.
"3rd Generation Partnership Project Technical Specification Group Services and System Aspects; Study on S2a Mobility based on GTP & WLAN access to EPC (SaMOG); Stage 2 (Release 12)", Technical Report, Apr. 18, 2013, XP050692439.
International Search Report PCT/ISA/210 for International Application No. PCT/EP2014/058469 dated May 6, 2014.
Written Opinion of the International Searching Authority PCT/ISA/237 for International PCT/EP2014/058469 dated May 6, 2014.
Jan Ellsberger et al., "P-HEVOR—System Requirements and Architecture," NGMN Allicance, Version 0.12, Feb. 11, 2013, pp. 1-19.
TSG SA2, "LS on Verification of Assumptions for Supporting Fixed Access as Trusted Network in Interworking Scenario," 3GPP TSG SA WG2 Meeting #95, S2-130680, Prague, Czech Republic, Jan. 28-Feb. 1, 2013, pp. 1-2.
NGMN Alliance, "Draft Liaison Statement from NGMN to GSMN, 3GPP, WFA and WBA," SA WG2 Meeting #S2-97, Busan, South Korea, May 27-31, 2013, pp. 1-2.
3GPP TR 23.839, V1.8.0, 3rd Generation Partnership Project; Technical Specification Group Services and System Aspects; Study on Support of BBF Access Interworking (Release 12); Jan. 2013, pp. 1-180.
Chinese Office Action dated Feb. 26, 2019 for CN Application No. 201480036508.5.
"3rd Generation Partnership Project; Technical Specification Group Services and System Aspects; 3GPP system—fixed broadband access network interworking; Stage 2 (Release 11)" 3GPP TS 23.139, No. V11.4.0, Mar. 5, 2013 XP051293018.
Office Action for corresponding European Application No. 13305557.4 dated Apr. 10, 2019.

* cited by examiner

SUPPORT OF QUALITY OF SERVICE CONTROL IN A MOBILE COMMUNICATION SYSTEM

CROSS-REFERENCE TO RELATED APPLICATIONS

This application is a national phase under 35 U.S.C. § 371 of PCT International Application No. PCT/EP2014/058469 which has an International filing date of Apr. 25, 2014, which claims priority to European Application No. 13305557.4, filed Apr. 29, 2013, the entire contents of each of which are hereby incorporated by reference.

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

In general, in a packet mobile communication system, an User Equipment (UE) has access to a mobile network providing Packet Data Network (PDN) connectivity services (typically IP connectivity services). A mobile network generally comprises a Core Network (CN) accessed by an Access Network (AN). The CN generally comprises, amongst others, a PDN Gateway (PDN-GW) interfacing with an external PDN (typically an IP network, such as Internet, Intranet, or Operator's IP network e.g. IMS network).

An example of packet mobile communication system is Evolved Packet System (EPS). An EPS network comprises a CN (called Evolved Packet Core (EPC)), which can be accessed by a 3GPP Access Network (3GPP AN) such as for example E-UTRAN, as well as by a Non-3GPP Access Network (non-3GPP AN) such as for example WLAN. 3GPP access to EPC for E-UTRAN is specified in particular in 3GPP TS 23.401. Non-3GPP Access to EPC is specified in particular in 3GPP TS 23.402.

A distinction between trusted and un-trusted non-3GPP ANs, for non-3GPP access to EPC, has been introduced in particular in 3GPP TS 23.402 and 3GPP TS 33.402. As described in 3GPP TS 23.402, a trusted non-3GPP AN interfaces with a PDN-GW (also called PGW in EPC) directly via an interface called S2a interface which can be based on GTP (GPRS Tunnelling Protocol)—or on PMIP (Proxy Mobile IP).

Figure 2:
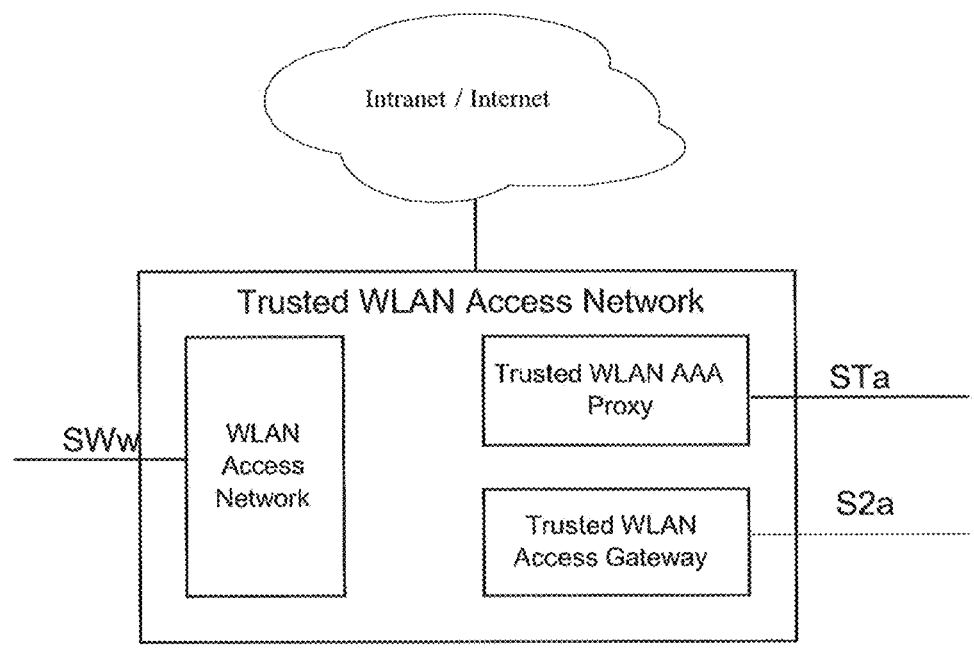

An example of architecture for Trusted WLAN access to EPC is illustrated in FIG. 1 taken from 3GPP TS 23.402. A functional split within a Trusted WLAN Access Network (TWAN) is illustrated in FIG. 2 taken from 3GPP TS 23.402. TWAN includes, in particular, a WLAN Access Network which interfaces with the UE, and a Trusted WLAN Access Gateway (TWAG) which terminates the S2a interface. The architecture is anyhow generic for any Non 3GPP Access Network and a Trusted WLAN Access Network (TWAN) is to be considered as just an example of any Trusted Non 3GPP Access Network (TNAN).

A PDN/IP connection established between an UE and a PDN/IP network over a mobile network (such as EPS network) can be used to have access to various IP-based user services or applications.

Quality of Service (QoS) is one of the most important issues in such systems. QoS support gives network operators tools for service differentiation by providing different treatment for traffic with different QoS requirements. Network-initiated QoS control gives network operators control over the QoS for the services they provide and includes a set of signalling procedures for controlling QoS assigned by the network. Network-initiated QoS control and associated signalling procedures are specified in particular in 3GPP TS 23.203. In EPS, these signalling procedures include procedures whereby a Policy and Charging Rules Function (PCRF) in EPC initiates the setting-up or modification of a dedicated bearer with a specific QoS for a specific user service or application, towards the UE. In the example of the architecture illustrated in FIG. 1, such signalling includes signalling between PCRF and PGW over the Gx interface that is transformed by the PGW into relevant signalling to the Access Network Gateway AN-GW (e.g. Serving Gateway reached over S5/S8 for a 3GPP Access Network, TWAG reached over S2a for a Trusted WLAN Access Network) using signalling (GTP/PMIP) defined over S5/S8/S2a. When Proxy Mobile IP is employed as signalling protocol towards the Access Network Gateway AN-GW, a Diameter based Gxa interface can be used to convey QoS requests directly from PCRF to the Access Network Gateway AN-GW (in this case QoS requests are not handled by the PGW).

A problem, however, for network-initiated QoS control for non-3GPP access to a 3GPP CN such as EPC, is to ensure that the UE applies proper QoS for uplink traffic. If such problem is not solved, uplink traffic may not be handled with adequate QoS, which, in particular for user services or applications having high QoS requirements (such as real-time user services or applications, such as for example voice over IMS), may not be acceptable. As recognized by the inventors and as will be explained with more detail later, there is a need for a generic solution to such problem. More generally there is a need to improve QoS control and/or performances of such systems.

Embodiments of the present invention in particular address such needs.

These and other objects are achieved, in one aspect, by a method for support of Quality of Service (QoS) control in a mobile communication system wherein an User Equipment has access to a mobile network providing Packet Data Network (PDN) connectivity services, said mobile network including a 3GPP Core Network (CN) accessed by a trusted non-3GPP Access Network (TNAN) via an interface between an Access Network Gateway AN-GW in said Trusted non-3GPP Access Network (TNAN) and a PDN Gateway PDN-GW in said 3GPP CN, said method including support of 3GPP CN-initiated QoS control, for uplink traffic from said UE, based on QoS control information received by said UE, said QoS control information allowing the UE to associate uplink traffic flows sent by the UE via Access Network Gateway AN-GW towards a PDN Gateway PDN-GW with TNAN connectivity QoS for uplink traffic.

These and other objects are achieved, in other aspects, by various entities of a mobile communication system, configured to carry out related step(s) of such method, said entities including, in particular (though not exclusively): User Equipment UE, Trusted non-3GPP Access Network Gateway (AN-GW) (such as in particular TWAG for Trusted WLAN access).

Figure 3:
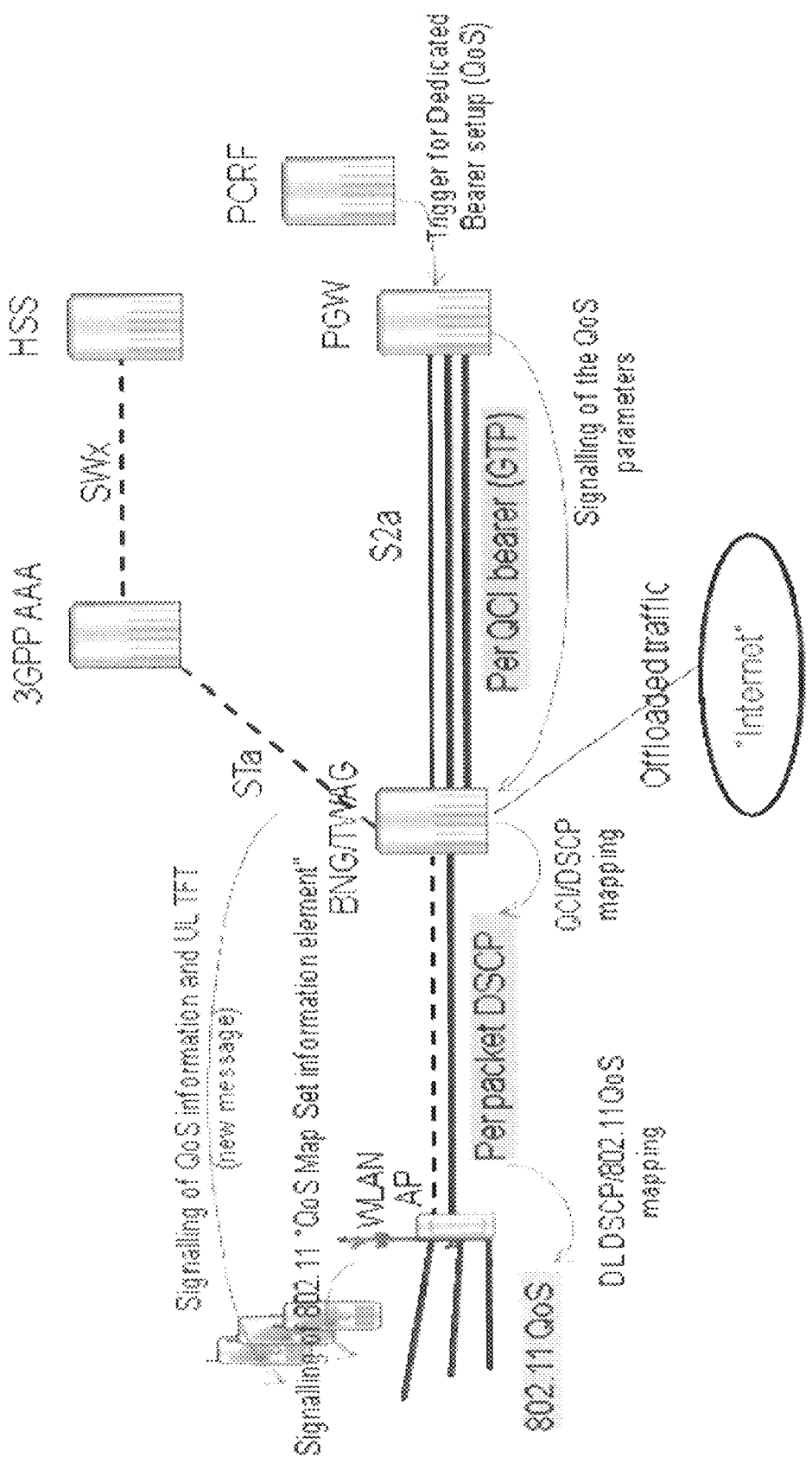

Some embodiments of apparatus and/or methods in accordance with embodiments of the present invention are now described, by way of examples only, and with reference to the accompanying drawings, in which:

FIG. 1 is intended to recall an example of architecture for Trusted WLAN Access to EPC, FIG. 2 is intended to recall an example of Trusted WLAN functional split, FIG. 3 is intended to illustrate an example of architecture for Trusted WLAN Access to EPC using embodiments of the present invention.

Various embodiments and/or aspects of the present invention will be more detailed in the following, by way of example for Trusted WLAN Access to EPC and EPC-initiated QoS control. However it should be understood that the present invention is not limited to this example, and more generally applies to Trusted Non-3GPP Access to a 3GPP CN and 3GPP-CN initiated QoS control.

Establishment/supervision/release of connections between a terminal (UE) and a PDN Gateway (PGW) in EPC through a Trusted WLAN is under study at 3GPP under the "SaMOG" Work/Study Item.

The Trusted WLAN is composed of at least one or several WIFI Access Points (AP) and a Trusted WLAN Gateway (TWAG), defined in 3GPP TS 23.402. The TWAG interfaces the PGW via a S2a interface which is similar the S5/S8 interface between a SGW and a PGW for E-UTRAN access to EPC.

Several solutions are proposed and they all comprise a protocol between the UE and the TWAG to establish, release and supervise PDN connections between the UE and the PGW. The UE is always the entity that initiates the establishment of PDN connections. These PDN connections are established with a Default Bearer over S2a, which is generally associated with a best effort quality of service (QoS) that is not adapted to services with tougher QoS requirements e.g. voice.

The UE can communicate to applications via such PDN connections. Certain applications (e.g. Voice over IMS) trigger PCRF (Policy and Charging Rules Function) to request connectivity with an appropriate QoS between the PGW and the UE for both uplink and downlink traffic of the application (e.g. voice). There are other possible triggers for the PCRF to decide upon requesting connectivity with an appropriate QoS between the PGW and the UE for both uplink and downlink traffic of the application. The notification of the detection of an application by a node enforcing traffic analysis/"Deep Packet Inspection" as an example of such other possible trigger.

PCRF requests the PGW to setup a "dedicated bearer" with the appropriate QoS (including the QoS Class Identifier QCI) and with traffic filters (used to map IP flows of the application, e.g. VoIP, onto the appropriate bearer hence to the appropriate QoS). The PGW establishes such bearer via setting "Traffic Filters" for downlink in the PGW (used to map IP flows onto bearers) and sends a GTP/PMIP signaling message to the TWAG containing the appropriate QCI and the appropriate Traffic Filter for the Uplink direction (called UL TFT).

In some deployments, the PCRF may contact directly the AN-GW (e.g. TWAG) to provide the AN-GW (e.g. TWAG) with the appropriate QoS requirements including traffic filters used to map IP flows (of the application, e.g. VoIP), onto the QoS required by these IP flows. A Diameter based interface is used for that purpose.

For the Downlink traffic, the TWAG maps the QCI to the appropriate transport QoS between the TWAG and the AP, and then the AP maps the transport QoS to the radio QoS (e.g. 802.11 QoS).

The downlink traffic that is sent once the dedicated bearer is established will therefore experience the required QoS.

However, the UE does not have the uplink Traffic Filters to correctly map the uplink traffic to the appropriate uplink QoS.

A possible solution to such problem would be that the UE looks at the IP packets of the IP flow received in the downlink and use the downlink QoS (e.g. DSCP or 802.11 QoS) to determine the uplink QoS. But this solution does not fit with unidirectional uplink traffic.

There is a need for a more generic solution to such problem.

Embodiments of the present invention in particular address such needs.

First embodiments of the present invention may comprise at least part of the following steps, which may be triggered when a non 3GPP Access Network Gateway AN-GW (*1) has received from the EPC (*2) information mapping Uplink IP flows (*3) from the UE to a 3GPP QoS:

the Access Network Gateway AN-GW provides the UE with information including following parameters: description of the Uplink IP flows (filtering rule) and of their associated QoS:
  e.g. using any signaling protocol between the AN-GW and the terminal (UE);
  e.g. adding a new downlink message in said signaling protocol to convey said information from the AN-GW to the terminal (UE);
The UE e.g. acknowledging the previous message via a new uplink message in said signaling protocol.

For each IP packet the UE needs to send Uplink to the EPC via the AN-GW the UE evaluates the filtering rules to map the Uplink IP packet to the appropriate QoS to use to send this packet to the EPC.

*1: an example of non 3GPP Access Gateway AN-GW is a TWAG (Trusted WLAN AN Gateway as defined in 3GPP TS 23.402)

*2: the Access Gateway AN-GW may receive the information mapping from the PGW (over S2a) or from the PCRF (e.g. over a Gx based Policy interface)

*3: the Uplink flows may correspond to IP traffic defined by its source and/or destination IP address and associated ports and/or application In other words, in the considered example of WLAN access to EPC and EPC-initiated QoS control, above-mentioned first embodiments include support of EPC-initiated QoS control, for uplink traffic from the UE, based on QoS control information received by the UE, said QoS control information allowing the UE to associate uplink traffic flows sent by the UE via TWAG towards PGW with an appropriate TWAN connectivity QoS for uplink traffic.

Still in other words, in these first embodiments and in this example, the UE receives from the TWAG rules mapping uplink traffic flows to TWAN connectivity QoS.

The term "traffic flow" has the meaning it usually has, i.e. it refers to a stream of packets sharing common features, e.g. packets having a same source and destination address, source and destination port number, and protocol ID (which is also referred to as packet filter information).

TWAN connectivity QoS may e.g. be defined by IP-level QoS parameter information, such as Differentiated Services CodePoint as defined in IETF RFC 2474 (DSCP) parameter set by the UE in the IP header of IP packets sent in uplink by the UE via the TWAG towards the PGW.

TWAN connectivity QoS may, or may not, be mapped to EPC connectivity QoS. EPC connectivity QoS may e.g. be defined by 3GPP QoS parameter information such as QCI parameter assigned to a 3GPP S2a bearer to which the traffic flow should be mapped. It may be preferred that such mapping between TWAN connectivity QoS and EPC connectivity QoS is provided, but this is not necessary. In embodiments described next, such mapping can be provided.

Second embodiments of the present invention may include at least part of the following steps which may be provided when a gateway in the core network (e.g. PGW) establishes or modifies a dedicated (bidirectional or unidirectional) bearer with a specific QoS over its interface with the Access Network Gateway (e.g. TWAG) via a signaling protocol (e.g. GTP or PMIPv6):

the Access Network Gateway (e.g. TWAG) provides the terminal (e.g. via a signaling message) with the appropriate 3GPP quality of service and packet filtering information (e.g. QCI, ARP, MBR for QoS information and UL TFT for packet filtering information, per 3GPP TS 24.008 or TS 23.402) enabling the terminal to map an IP flow to an appropriate set of 3GPP QoS parameters. In addition, the Access Network Gateway provides the mapping between the IP QoS (e.g. DSCP) and the 3GPP QoS (e.g. QCI) that is applied by the AN-GW to an uplink IP packet, in order for the UE to derive the IP QoS to be applied to an uplink IP packet, for each IP packet the UE needs to send Uplink to the EPC via the Access Gateway AN-GW the UE evaluates the filtering rules (received from the Access Network Gateway AN-GW) to map the Uplink IP packet to the appropriate QoS to use to send this packet to the EPC; This allows the uplink entities on the path (e.g. radio access point, Access Network Gateway AN-GW) to Provide the adequate QoS on the path from the UE to the PGW route the uplink IP flow towards the corresponding bearer between the Access Network Gateway AN-GW and the core network (e.g. PGW).

In other words, in the considered example of WLAN access to EPC and EPC-initiated QoS control, above-mentioned second embodiments include support of EPC-initiated QoS control, for uplink traffic from the UE, based on QoS control information received by the UE:

said QoS control information allowing the UE to associate uplink traffic flows sent by the UE via TWAG towards PGW with TWAN connectivity QoS for uplink traffic, said QoS control information received by said UE including first QoS control information associating uplink traffic flows with 3GPP CN connectivity QoS, and second QoS control information mapping 3GPP CN connectivity QoS to TWAN connectivity QoS for uplink traffic.

Still in other words, in these second embodiments and in this example, the UE receives from the TWAG rules mapping:

first from uplink traffic flows to EPC connectivity QoS, second from EPC connectivity QoS to TWAN connectivity QoS.

In the example of Trusted WLAN access network with access to EPC, as also illustrated in FIG. 3 for the case of a GTP based interface between the PGW and the AN-GW, the PCRF requests the PGW to allocate appropriate resources and the PGW either establishes a new dedicated bearer with the appropriate QCI (defined in 3GPP TS 23.203) or modifies the existing dedicated bearer (using the Create Dedicated Bearer Request or the Update Bearer Request GTP-c messages). Each bearer is associated with a QCI. Among other parameters, the QCI, the uplink maximum bit rate, the Allocation/Retention Priority (ARP) and the EPS Bearer Level Traffic Flow Template (Bearer TFT) parameters are sent over S2a interface to the TWAG via GTP-c message as specified in 3GPP TS 29.274 (see clause 8.15 and 8.19), or any signaling message from PGW. EPS Bearer Level TFT IE is specified in 3GPP TS 24.008 clause 10.5.6.12 and contains uplink and downlink filters.

In some deployments, the PCRF may contact directly the AN-GW (e.g. TWAG) to provide the AN-GW (e.g. TWAG) with the appropriate QoS requirements including traffic filters (Flow-Information) used to map IP flows (of the application, e.g. VoIP) onto the QoS-Information (QCI) required by these IP flows.

Third embodiments of the invention may comprise at least part of the following steps, which may be triggered in case of establishing a new dedicated bearer or modifying an existing dedicated bearer:

Providing the UE with information including following parameters: traffic filtering parameters contained in the TFT (containing uplink and downlink filters), and either QoS parameters that correspond to 3GPP QoS parameters (QCI with possibly ARP, MBR Maximum Bit Rate) and mapping between IP level QoS parameters (e.g. DSCP) and 3GPP QoS parameters that is applied in the AN-GW for the uplink traffic, or IP level QoS parameters (e.g. DSCP) that may or not be mapped to 3GPP QoS parameters;

Using any signaling protocol between the TWAG and the terminal (UE);

Adding a new downlink message in the said signaling protocol to convey the said information from the TWAG to the terminal;

Adding a new uplink message in the said signaling protocol from the terminal to the TWAG to acknowledge the previous message;

Triggering the downlink message from the TWAG to the terminal after the

TWAG has received S2a GTP Create Bearer Request message (or any message from a PGW or from a PCRF and that is associated with new QoS requirements for the traffic flows related with the UE).

In other words, in the considered example of WLAN access to EPC and EPC-initiated QoS control, above-mentioned third embodiments include support of EPC-initiated QoS control, for uplink traffic from the UE, based on QoS control information received by the UE, said QoS control information allowing the UE to associate uplink traffic flows sent by the UE via TWAG towards PGW with TWAN connectivity QoS for uplink traffic (as in said first embodiments), wherein said QoS control information received by said UE may (as in said second embodiments) include first QoS control information associating uplink traffic flows with 3GPP CN connectivity QoS, and second QoS control information mapping 3GPP CN connectivity QoS to TWAN connectivity QoS for uplink traffic.

Still in other words, in these third embodiments and in this example, the UE may receive from the TWAG:

either (as in said first embodiments) rules mapping uplink traffic flows to TWAN connectivity QoS, or (as in said second embodiments) rules mapping:

first from uplink traffic flows to EPC connectivity QoS, and second from EPC connectivity QoS to TWAN connectivity QoS.

In FIG. 3, QoS control information received by the UE is illustrated by "QoS information and UL TFT" signaled by TWAG to UE in a new message.

FIG. 3 also illustrates the mapping, at the TWAG, between EPC connectivity QoS (e.g. QCI) and TWAN connectivity QoS (e.g. DSCP).

Different embodiments (including part or all of above described embodiments), may also include that:

The mapping from IP level parameter (e.g. DSCP parameter) to 802.11 QoS parameter is done by the UE based on information broadcast by the Access Point (AP), i.e. based on principles described in IEEE 802.11, which is illustrated in FIG. 3 by the WLAN AP signaling 802.11 "QoS Map Set information element".

In one aspect, there is provided a method for support of Quality of Service QoS control in a mobile communication system wherein an User Equipment (UE) has access to a mobile network providing Packet Data Network (PDN) connectivity services, said mobile network including a 3GPP Core Network (CN) accessed by a trusted non-3GPP Access Network (TNAN) via an interface between an Access Network Gateway (AN-GW) in said Trusted non-3GPP Access Network (TNAN) and a PDN Gateway (PDN-GW) in said 3GPP CN, said method including support of 3GPP CN-initiated QoS control, for uplink traffic from said UE, based on QoS control information received by said UE, said QoS control information allowing the UE to associate uplink traffic flows sent by the UE via Access Network Gateway (AN-GW) towards a PDN Gateway (PDN-GW) with TNAN connectivity QoS for uplink traffic.

Various embodiments are provided, which may be used alone or in combination, according to various combinations.

In an embodiment, said QoS control information received by said UE includes packet filter information associated with uplink traffic flows.

In an embodiment, said QoS control information received by said UE includes mapping between uplink traffic flows and TNAN connectivity QoS for uplink traffic.

In an embodiment, said QoS control information received by said UE includes first QoS control information associating uplink traffic flows with 3GPP CN connectivity QoS, and second QoS control information mapping 3GPP CN connectivity QoS to TNAN connectivity QoS for uplink traffic.

In an embodiment, 3GPP CN connectivity QoS parameter information includes 3GPP QoS parameter information.

In an embodiment, TNAN connectivity QoS parameter information includes IP level QoS parameter information.

In an embodiment, said method comprises:
said AN-GW receiving first QoS control information associating uplink traffic flows with 3GPP CN connectivity QoS from said PDN-GW In an embodiment, said method comprises:
said AN-GW generating a mapping from 3GPP CN connectivity QoS to TNAN connectivity QoS for uplink traffic.

In an embodiment, said method comprises:
said AN-GW sending said QoS control information for uplink traffic to said UE using a signalling protocol between said AN-GW and said UE.

In an embodiment, said method comprises:
said UE acknowledging the reception of said QoS control information from said AN-GW, using a signalling protocol between said UE and said AN-GW.

In an embodiment, mapping of TNAN connectivity QoS to Trusted Non 3GPP Radio QoS is communicated by a Trusted Non 3GPP Radio Controller in said Trusted non-3GPP Access Network (TNAN) to the UE via Trusted Non 3GPP Radio signalling.

In an embodiment, information on the mapping of TNAN connectivity QoS to Trusted Non 3GPP Radio QoS is exchanged between the Access Network Gateway AN-GW and the Trusted Non 3GPP Radio Controller in said Trusted non-3GPP Access Network (TNAN).

In an embodiment, said method comprises:
said UE using said QoS control information from said AN-GW to map uplink traffic flows to said TNAN connectivity QoS for uplink traffic.

Other embodiments may also be provided, based on above description.

In other aspects, there are provided various entities configured to carry out related step(s) of such method, said entities including, in particular (though not exclusively): User Equipment UE, Trusted non-3GPP Access Network Gateway AN-GW (such as in particular TWAG for Trusted WLAN access).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
a memory storing computer-readable instructions; and
at least one processor configured to execute said computer-readable instructions to cause said apparatus to
receive traffic flow template and third generation partnership project quality of service parameter information assigned to a third generation partnership project S2a dedicated bearer, enabling said apparatus to associate an uplink traffic flow sent by said apparatus at trusted wireless local area network access to a third generation partnership project core network with a third generation partnership project quality of service, said third generation partnership project quality of service parameter information including a quality of service class identifier parameter,
receive mapping information enabling said apparatus to map said quality of service class identifier parameter to a differentiated services code point parameter, and
apply said differentiated services code point parameter to an uplink internet protocol packet of said uplink traffic flow.

2. A method comprising:
receiving traffic flow template and third generation partnership project quality of service parameter information assigned to a third generation partnership project S2a dedicated bearer, enabling an uplink traffic flow sent at trusted wireless local area network access to a third generation partnership project core network to be associated with a third generation partnership project quality of service, said third generation partnership project quality of service parameter information including a quality of service class identifier parameter;
receiving mapping information enabling said quality of service class identifier parameter to be mapped to a differentiated services code point parameter; and
applying said differentiated services code point parameter to an uplink internet protocol packet of said uplink traffic flow.

* * * * *